March 28, 1933.　　　P. MacKENZIE　　　1,903,221
AUTOMOTIVE TRANSMISSION
Filed Aug. 6, 1929　　　5 Sheets-Sheet 1

INVENTOR.
Philip MacKenzie
BY Townsend, Loftus & Abbett
ATTORNEYS.

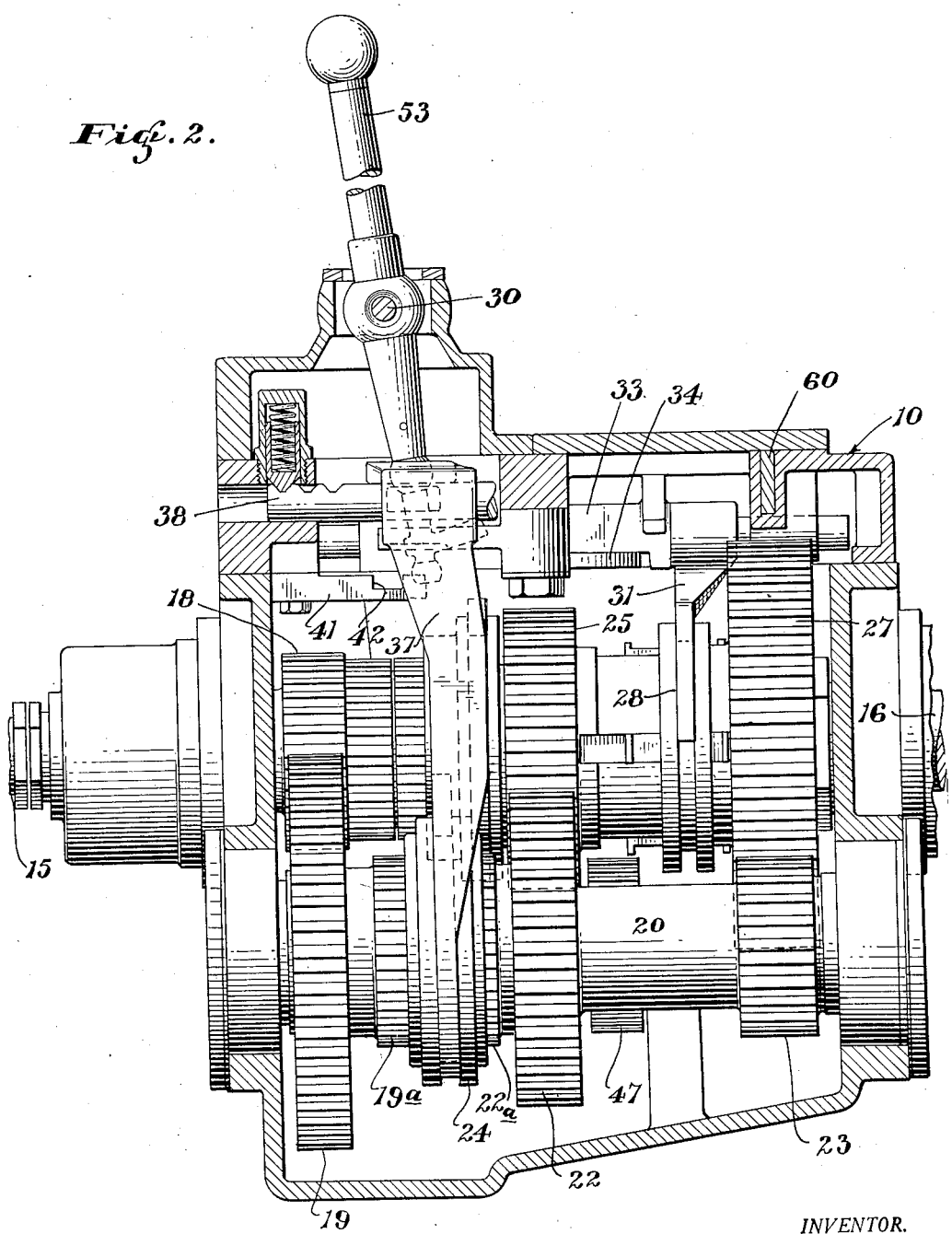

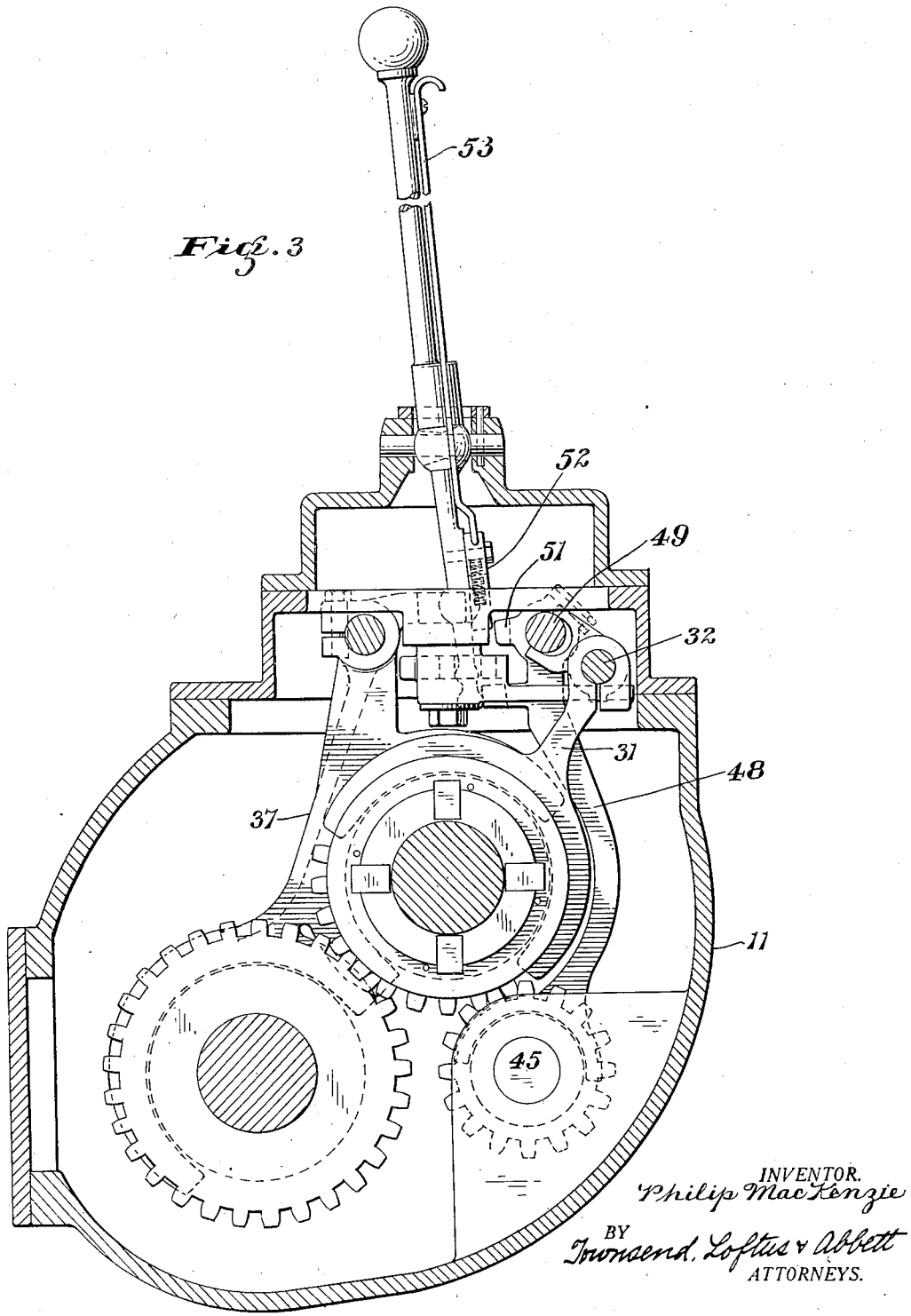

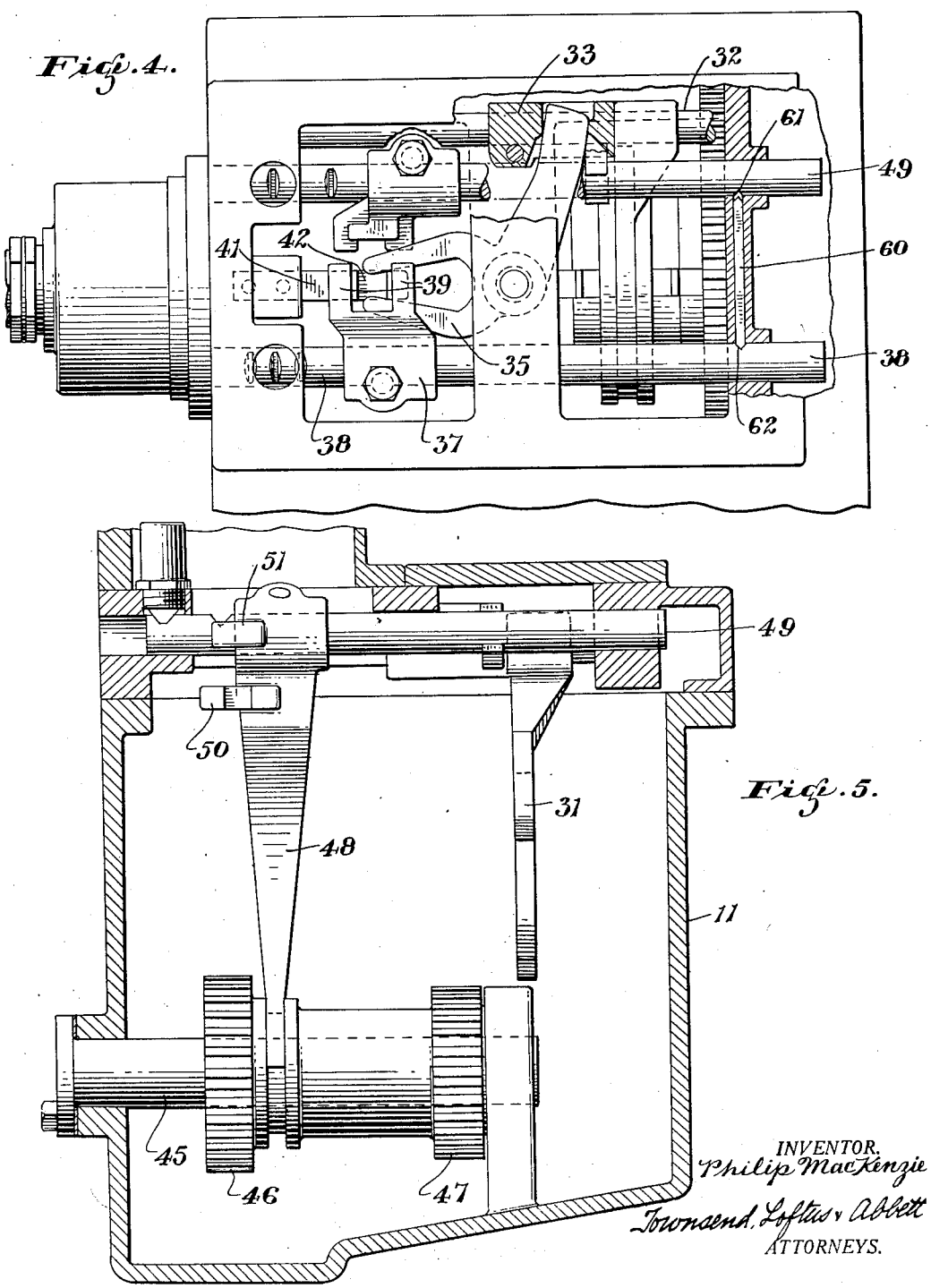

March 28, 1933.  P. MacKENZIE  1,903,221
AUTOMOTIVE TRANSMISSION
Filed Aug. 6, 1929  5 Sheets-Sheet 5
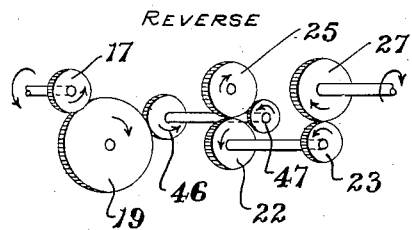
2ND GEAR
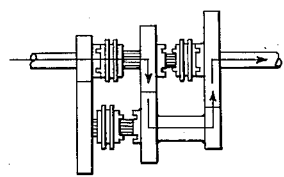
*Fig.6.*
1ST GEAR
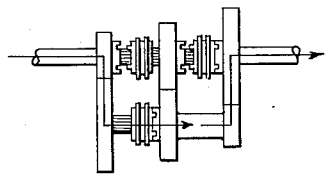
4TH GEAR
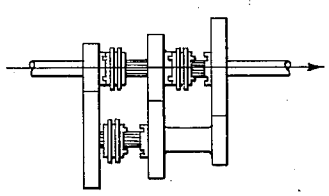
3RD GEAR
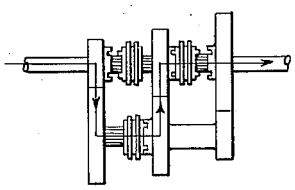
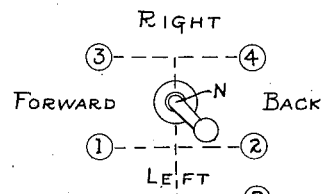
INVENTOR.
Philip MacKenzie
BY
Townsend, Loftus & Abbett
ATTORNEYS.

Patented Mar. 28, 1933

1,903,221

UNITED STATES PATENT OFFICE

PHILIP MacKENZIE, OF OAKLAND, CALIFORNIA, ASSIGNOR OF ONE-FOURTH TO ROBERT MANN, OF OAKLAND, CALIFORNIA, AND ONE-FOURTH TO JOSEPH MANN, OF BERKELEY, CALIFORNIA

AUTOMOTIVE TRANSMISSION

Application filed August 6, 1929. Serial No. 383,934.

This invention relates to transmissions for automotive vehicles.

It is the principal object of the present invention to provide an improved transmission wherein all of the gears are in constant mesh and by means of which four speeds ahead and one reverse speed may be obtained through the medium of a minimum number of gears.

In carrying out this object into practice I provide a transmission wherein the gears are in constant mesh and different combinations thereof may be obtained by the use of clutches. The relative disposition of the clutches and gears is such that I am enabled to so compound the gears to obtain four speeds ahead and one reverse speed with a minimum number of gears.

One form which the invention may assume is exemplified in the following description and illustrated by way of example in the accompanying drawings, in which:

Fig. 2 is a view in side elevation of the transmission with the housing in section.

Fig. 3 is a transverse section through the transmission taken on line III—III of Fig. 1.

Fig. 4 is a plan view of the transmission showing the arrangement of the shifting shafts therein.

Fig. 5 is a plan view in longitudinal section through the transmission showing the arrangement of the reverse gears thereon.

Figure 1:
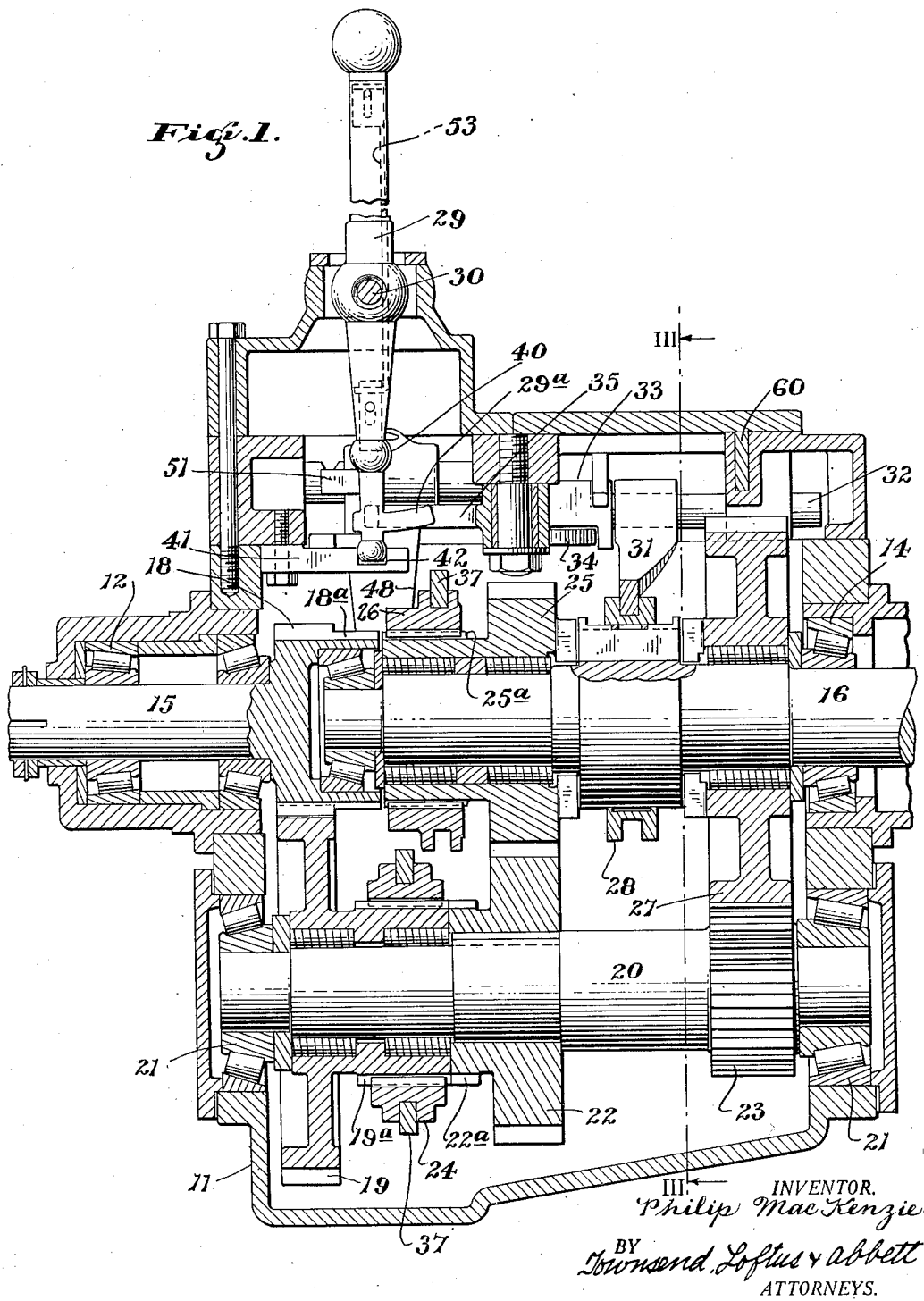
Fig. 1 is a longitudinal and vertical section taken through the transmission in alignment with the center of the shafts thereof.

Fig. 6 discloses diagrammatic views illustrating the relative positions of the gears and showing the different combinations effected during the different drives.

Referring more particularly to the accompanying drawings, 10 indicates a transmission particularly adapted for use in automotive vehicles. This transmission includes a housing 11 which completely encloses the working parts so that they may run in a lubricant. This housing 11 is fitted with end bearings 12 and 14 which are in alignment. The bearing 12 receives a drive shaft 15 and the bearing 14 receives and supports a driven shaft 16. The inner end of the drive shaft 15 is formed with a gear 18. This end of the drive shaft is counterbored and fitted with a bearing to receive and support the inner end of the driven shaft 16.

The drive gear 18 is in constant mesh with a first countershaft gear 19 normally rotatable on a countershaft 20 arranged parallel to the driving and driven shafts and supported at its ends in bearings 21.

The countershaft 20 is fitted with second and third countershaft gears 22 and 23 which are fixed thereon. The gears 19 and 22 on the countershaft are formed with adjacent clutch faces 19a and 22a with which a sliding clutch member 24 cooperates. This clutch member 24 is operative so that it may reciprocate co-axially of the countershaft and connect the gear 19 to the gear 22. Such connection clutches the gear 19 to the countershaft. When the clutch member 24 is in neutral position as shown in Fig. 1, the gear 19 is free to rotate on the countershaft 20.

The second countershaft gear 22 is in mesh with a compound gear 25 which is normally rotatable on the driven shaft 16. The compound gear 25 and the drive gear 18 are formed with adjacent clutch faces 18a and 25a with which a clutch member 26 cooperates. This clutch member when engaged with both faces 18a and 25a connects the two gears 18 and 25. When the clutch member 26 is in neutral the gears 18 and 25 are free for relative rotation.

A driven gear 27 is rotatably mounted on the driven shaft 16 at a spaced distance from the compound gear 25 and in constant mesh with the third countershaft gear 23.

A clutch 28 is mounted on the driven shaft 16 between the gears 25 and 27 and is operative to connect either of these gears to the driven shaft or to be disposed in a neutral position permitting rotation of the gears on the shaft. This clutch is of the positive engagement type and is described and claimed in my Letters Patent No. 1,638,590 issued August 8, 1927.

To obtain a selective drive the various clutches are selectively engaged to obtain different combinations of gears and thereby drive the driven shaft at different speeds relative to the drive shaft.

To accomplish this I provide a shift lever 29 centrally connected by a universal connection 30 to the housing 11. This lever is adapted to operate a shifting fork 31 which is connected to the clutch member 28 and to a shifting fork 37 which is connected to both the clutch members 24 and 26. The relative position of the latter members is such that but one of them can be engaged at the same time.

The shifting fork 31 is operated by transverse oscillation of the lever 29 while the fork 37 is operated by longitudinal oscillation of the lever 29 after it is moved transversely with its lower end either to the left or to the right.

The shifting fork 31 is secured to a shifting shaft 32 mounted for reciprocating movement longitudinally of the transmission in a horizontal plane. Also secured on this shifting shaft 32 is a socket member 33. This socket member is engaged by one end of a bell crank lever 34 which is pivoted to the housing for oscillation in a horizontal plane. The other end of this lever 34, or that indicated by the numeral 35, is bifurcated and extends forwardly of the pivotal point of the lever substantially in alignment with the shifting lever 29. The lower end of this shifting lever engages this bifurcated end of the lever 34 so that when the lever 29 is oscillated transversely it will be accompanied by oscillation of the lever 34. As one end of the lever 34 extends transversely and engages the socket 33 on the shaft 32 transverse oscillation of the shift lever 29 will be accompanied by longitudinal reciprocation of the shifting shaft 32 and the fork 31. In order to prevent the shift lever 29 from disengaging from the bifurcated end 35 of the lever 34, the lower end of the shifting lever 29 is formed with an extension 29a in constant engagement with the bifurcated end 35. From this it is apparent that by oscillating the shifting lever 29 transversely of the transmission the shifting fork 31 will be operated to engage the clutch member 28 with either of the gears 25 or 27 depending in which position the shifting lever 29 is placed.

In order to operate the shifting fork 37 the latter is fixed to a shifting shaft 38 arranged longitudinally of the transmission. The upper end of the shifting fork 37 is formed with a pair of spaced lugs 39 which are in alignment with a knob 40 formed adjacent to the lower end of the shifting lever 29. When the shifting lever 29 is shifted to the left or right transversely the knob 40 will engage the lugs 39 so that longitudinal oscillation of the shifting lever 29 will be accompanied by longitudinal reciprocation of the shifting fork 37. This will operate the clutch members 24 and 26 in unison. It is desired to point out that the knob 40 on the shifting lever 29 remains in constant engagement with the lugs 39 on the shifting fork 37 regardless of whether or not the shifting lever 29 is shifted to the right or left. The only time that the knob 40 disengages from the spaced lugs 39 is when the shift lever is moved transversely a distance sufficient to operate the reverse gear mechanism as will be hereinafter described.

In order to prevent movement of the shifting lever transversely until the clutch members 24 and 26 are placed in neutral I provide a fixed alignment member 41 which is provided with a transverse slot 42 with which the extreme lower end of the shifting lever 29 aligns when the shifting lever is moved to position placing the clutch members 24 and 26 in neutral. When the clutch members 24 and 26 are in neutral the lower end of the shifting lever 29 will be in alignment with the slot 42 and the shift lever 29 may be shifted transversely. After the clutch members 24 and 26 are shifted from neutral position the lower end of the shifting lever 29 will not be in register with the slot or socket 42. In such event any attempt to shift the shifting lever 29 transversely will be prevented by engagement of the lower end of the lever 29 with the member 41.

In order to combine the gears to obtain the lowest speed reduction, the upper end of the shifting lever is moved to the left which shifts the clutch member 28 rearwardly and clutches the driven gear 27 to the driven shaft 16. The upper end of the shifting lever 29 is then moved forwardly which shifts the fork 37 rearwardly, retains the clutch member 26 in neutral, and causes the clutch member 24 to connect the first countershaft gear 19 to the second countershaft gear 22. This effectively clutches the gear 19 to the countershaft. A drive will then be transmitted from the drive gear 18 to the countershaft 20 through the first countershaft gear 19 and thence from the third countershaft gear 23 to the driven gear 27. As this latter is clutched to the driven shaft, the latter will be driven at a reduced speed relative to the drive shaft 15.

To obtain a second speed it is only necessary to shift the upper end of the shifting lever 29 rearwardly from the position it assumes when in low gear, which movement shifts the fork 37 forwardly. This movement of the fork 37 places the clutch member 24 in neutral and then positions the clutch member 26 to connect the compound gear 25 to the drive gear 18. As the shifting lever 29 has not been shifted transversely, the clutch 28 will remain in position and clutch the driven gear 27 to the shaft 16. The drive will then be from the drive shaft 15 to the compound gear 25 and thence to the countershaft through the second countershaft gear 22 and from the third countershaft gear 23 to the driven shaft 16 through the driven gear 27.

To obtain a third speed the shifting lever 29 is returned to neutral position and its upper end is shifted to the right which operates the fork 31 causing the clutch member 28 to clutch the compound gear 25 to the driven shaft. The upper end of the shifting lever 29 is then shifted forwardly returning the clutch member 26 to neutral and positioning the clutch member 24 to connect the first countershaft gear 19 to the second countershaft gear 22. The drive will then be from the drive gear 18 to the countershaft and thence to the compound gear and driven shaft gear 16 from the second countershaft gear 22.

To obtain a fourth speed or direct drive, the upper end of the shifting lever 29 is merely moved to its full rearward position. As the lever has not been shifted transversely, the clutch member 28 will remain in position clutching the compound gear 25 to the driven shaft. The rearward movement of the upper end of the shifting lever 29, however, will cause the lower end thereof to shift the fork 37 forwardly returning the clutch member 24 to neutral and then causing the clutch member 26 to form a driving connection between the driving gear 18 and the compound gear 25. As the clutch 28 clutches the compound gear 25 to the shaft and the clutch 26 directly connects the driving gear 18 to the compound gear, a drive will be established from the driving gear 18 to the compound gear 25, and as the latter is fixed on the shaft 16 this shaft will be driven at the same speed as the drive shaft.

In Fig. 6 I have diagrammatically illustrated the relative positions which the various parts assume in obtaining the different speeds.

I also provide a reverse gear for driving the driven shaft 16 in a direction which is reverse to that of the driven shaft 16. A mechanism for effecting a reverse drive is most clearly illustrated in Figs. 3 and 4 and 5. This mechanism includes a reverse shaft 45 carrying a pair of gears 46 and 47 which are relatively fixed together and which are free to revolve on the reverse shaft 45. The gears are operatively associated with a fork 48 which is operative to shift the gears along the shaft 45.

The upper end of the fork 48 is secured on a shift rod 49. The shift fork 48 is provided with a socket 50 and a stop lug 51. The stop lug 51 cooperates with a stop latch 52 in normally preventing the shift lever from being moved to the left sufficiently to place its lower end in engagement with the socket 50 on the fork 48. The latch 52 is reciprocable on the shifting lever 29 and is shifted by means of an operating rod 53. This operating rod may be reciprocated along the shifting lever to withdraw the latch 52 from engagement with the stop lug 51 so as to permit the lower end of the lever 29 to engage with the socket 50. Upon such engagement the upper end of the shifting lever 29 may be shifted rearwardly and place the gears 46 and 47 into mesh with the countershaft gear 19 and the compound gear 25 respectively. The drive established is from the drive gear 18 to the countershaft gear 19 thence to the reverse gear 46 to the second reverse gear 47. From the gear 47 the drive is transmitted to the compound gear 25 and as this gear is free to rotate on the driven shaft 16 it will drive the countershaft 20 through the countershaft gear 22. As the third countershaft gear 23 is fixed on the countershaft, the drive will then be transmitted to the driven gear 27 and to the driven shaft 16 due to the fact that the operation of the clutch lever 29 has been shifted transversely prior to engaging the reverse gears to place the clutch member 28 in position clutching the driven gear 27 to the shaft 16. The driven shaft will be driven in a direction reverse to the drive shaft by this arrangement of gears.

In operation of the transmission it is constructed and assembled substantially as illustrated and described. If it is desired to compound the gears in such a manner as to obtain a low speed, the shifting lever 29 is manipulated to cause the clutch 28 to clutch the driven gear 27 to the driven shaft 16 and to cause the clutch 24 to connect the first countershaft gear 19 to the countershaft 20 through the medium of the gear 22. The drive will then be from the drive gear 18 to the countershaft through the gear 19 and thence to the driven shaft 16 to the gears 23 and 27.

To obtain a second speed the shifting lever 29 is shifted rearwardly so as to maintain the clutch 28 in position clutching the gear 27 to the driven shaft and positioning the clutch member 26 so as to directly connect the drive shaft to the gear 25. The drive will then be from the drive shaft 15 to the countershaft through the gears 25 and 22 and from the countershaft to the driven shaft through the gears 23 and 27.

To effect a third speed the shifting lever 29 is shifted to cause the clutch 28 to connect the compound gear 25 to the shaft 16 and to position the clutch 24 to connect the gear 19 to the gear 22. The drive thus obtained will be from the drive gear 18 to the first countershaft gear 19 and thence to the driven shaft through the gears 22 and 25.

To effect a fourth speed the shifting lever 29 is operated to cause the clutch 26 to connect the gear 25 directly to the gear 18 and to clutch the gear 25 to the driven shaft 16 by means of the clutch member 28. Thus the drive will be directly from the drive shaft to the driven shaft.

To obtain a reverse drive the stop latch 52 is moved to unobstructing position relative to the lug 51 and the lever 29 is shifted to place the reverse gears 46 and 47 into mesh with the countershaft gear 19 and the compound gear 25. When the gears are in this position a drive will be transmitted from the drive shaft to the reverse gears through the gear 19 and thence to the driven gear 27 through the gears 25, 22 and 23. Due to the fact that the driven gear 27 will be clutched to the shaft 16, the latter will be driven in a direction reverse to the shaft 15.

As previously described when the shift lever 29 is moved transversely to operate the reverse mechanism the knob 40 thereon disengages from the shift fork 37. In order to prevent movement of the shifting fork 37 during this period I provide a latch member 60 (see Fig. 4) which cooperates with the reverse shift shaft 49 and the shift shaft 38. The latch member 60 is mounted for transverse reciprocation in the transmission housing and is adapted to cooperate with notches 61 and 62 in the shift shafts 49 and 38. When the shift lever 29 is shifted to neutral position prior to being shifted into reverse, the notch 62 in the shaft 38 aligns with the latch 60. When the shift lever 29 is moved to actuate the reverse gear mechanism and shifts the shift shaft 49, the notch 61 in the shaft 49 moves out of alignment with the latch 60 causing the latter to move transversely to engage the notch 62 in the shaft 38. This effectively latches the shaft 38 and its fork 37 from movement during the operation of the reverse gear mechanism.

From the foregoing it is obvious that I have provided a transmission having four speeds ahead and one reverse speed which are obtained through the medium of a minimum of gears which are always in mesh.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. A transmission including a casing, a drive shaft projecting into the casing, a driven shaft journalled in the casing in alignment with the drive shaft, a countershaft in the casing arranged parallel to the drive and driven shafts, a drive gear fixed on the drive shaft, a first gear rotatable on the countershaft and in constant mesh with the drive gear, a compound gear and a driven gear rotatably mounted on the driven shaft, a second gear and a third gear fixed on the countershaft in constant mesh with the compound gear and the driven gear, a clutch on the driven shaft operatively associated with the compound gear and with the driven gear, a clutch associated with the countershaft and the first countershaft gear, a shift lever operatively connected with said clutches whereby a transverse shift of said lever in one direction from neutral position will clutch the compound gear to the driven shaft, and a transverse shift in the other direction from neutral position will clutch the driven gear to the driven shaft, and a longitudinal shift after the lever has assumed one transverse position will engage the clutch associated with the countershaft gear.

2. A transmission including a casing, a drive shaft projecting into the casing, a driven shaft journalled in the casing in alignment with the drive shaft, a countershaft in the casing arranged parallel to the drive and driven shafts, a drive gear fixed on the drive shaft, a first gear rotatable on the countershaft and in constant mesh with the drive gear, a compound gear and a driven gear rotatably mounted on the driven shaft, a second gear and a third gear fixed on the countershaft in constant mesh with the compound gear and the driven gear, a clutch associated with the drive shaft and with the compound gear to clutch the compound gear to the drive shaft, a clutch on the driven shaft adapted to clutch either the compound gear or the driven gear to the driven shaft, a clutch associated with the countershaft and with the first countershaft gear to clutch the latter to the countershaft, a shift lever, connections between said shift lever and said clutches, said connections causing a transverse shift of said lever in one direction from neutral position to clutch the compound gear to the driven shaft, and a transverse shift in the other direction from neutral to clutch the driven gear to the driven shaft, and a longitudinal shift after the lever has assumed one transverse position to clutch the compound gear to the drive shaft or clutch the countershaft gear to the countershaft.

3. A transmission including a casing, a drive shaft projecting into the casing, a driven shaft journalled in the casing in alignment with the drive shaft, a countershaft in the casing arranged parallel to the drive and driven shafts, a drive gear fixed on the drive shaft, a first gear rotatable on the countershaft and in constant mesh with the drive gear, a compound gear and a driven gear rotatably mounted on the driven shaft, a second gear and a third gear fixed on the countershaft in constant mesh with the compound gear and the driven gear, a clutch associated with the drive shaft and with the compound gear to clutch the compound gear to the drive shaft, a clutch on the driven shaft adapted to clutch either the compound gear or the driven gear to the driven shaft, a clutch associated with the countershaft and with the first countershaft gear to clutch the latter to the countershaft, a shift lever, connections between said shift lever and said clutches, said connections causing a transverse shift of said lever in one direction from neutral position to clutch the compound gear to the driven shaft, and a transverse shift in the other direction from neutral to clutch the driven gear to the driven shaft, and a longitudinal shift after the lever has assumed one transverse position to clutch the compound gear to the drive shaft or clutch the countershaft gear to the countershaft, and means preventing operation of the shift lever transversely until the clutches between the compound gear and the drive shaft and between the first countershaft gear and the countershaft are in neutral position.

4. A transmission including a casing, a drive shaft projecting into the casing, a driven shaft journalled in the casing in alignment with the drive shaft, a countershaft in the casing arranged parallel to the drive and driven shafts, a drive gear fixed on the drive shaft, a first gear rotatable on the countershaft and in constant mesh with the drive gear, a compound gear and a driven gear rotatably mounted on the driven shaft, a second gear and a third gear fixed on the countershaft in constant mesh with the compound gear and the driven gear, a clutch associated with the drive shaft and with the compound gear to clutch the compound gear to the drive shaft, a clutch on the driven shaft adapted to clutch either the compound gear or the driven gear to the driven shaft, a clutch associated with the countershaft and with the first countershaft gear to clutch the latter to the countershaft, and means selectively operating said clutches to effect different compounding of said gears and drive the driven shaft at different speeds relative to the drive shaft, reverse gears associated with the gears on the countershaft and on the driven shaft and capable of being placed in mesh with the first countershaft gear and with the compound gear subsequent to the clutching of the driven gear to the driven shaft whereby the driven shaft will be driven in a direction reverse to that of the drive shaft.

5. A transmission including a casing, a drive shaft projecting into the casing, a driven shaft journalled in the casing in alignment with the drive shaft, a countershaft in the casing arranged parallel to the drive and driven shafts, a drive gear fixed on the drive shaft, a first gear rotatable on the countershaft and in constant mesh with the drive gear, a compound gear and a driven gear rotatably mounted on the driven shaft, a second gear and a third gear fixed on the countershaft in constant mesh with the compound gear and the driven gear, a clutch associated with the drive shaft and with the compound gear to clutch the compound gear to the drive shaft, a clutch on the driven shaft adapted to clutch either the compound gear or the driven gear to the driven shaft, a clutch associated with the countershaft and with the first countershaft gear to clutch the latter to the countershaft, and means selectively operating said clutches to effect different compounding of said gears and drive the driven shaft at different speeds relative to the drive shaft, reverse gears associated with the gears on the countershaft and on the driven shaft and capable of being placed in mesh with the first countershaft gear and with the compound gear subsequent to the clutching of the driven gear to the driven shaft whereby the driven shaft will be driven in a direction reverse to that of the drive shaft, a shift lever constituting the means for engaging the clutches and shifting the reverse gears, and means normally effective to prevent the shift lever from shifting the reverse gears.

6. A transmission including a casing, a drive shaft projecting into the casing, a driven shaft journalled in the casing in alignment with the drive shaft, a countershaft in the casing arranged parallel to the drive and driven shafts, a drive gear adapted to receive a drive from the drive shaft, a first gear mounted on the countershaft and in mesh with the drive gear, a pair of relatively fixed gears mounted on the countershaft, a pair of gears rotatably mounted on the driven shaft and in mesh with said relatively fixed countershaft gears, clutch means for clutching one of said gears to the driven shaft, a pair of relativ ly fixed reverse gears adapted to be placed in mesh one with the first countershaft gear and the other with a rotatable gear on the driven shaft.

7. A transmission including a casing, a drive shaft projecting into the casing, a driven shaft mounted in the casing in axial alignment with the drive shaft, a countershaft mounted in parallelism to the driven shaft, a drive gear fixed on the drive shaft, a first countershaft gear on the countershaft and in constant mesh with the drive gear, a pair of gears rotatably mounted on the driven shaft, a pair of gears on the countershaft in constant mesh with said rotatable gears on the said driven shaft, a clutch on the driven shaft operatively associated with the two rotatable gears thereon, a clutch associated with the countershaft and the countershaft gears, and reverse gears relatively fixed together and adapted to be placed in mesh, one with a rotatable gear on the driven shaft and the other with a rotatable gear on the countershaft, and a shift lever operative to operate said clutch means and reverse gears in desired sequence.

PHILIP MacKENZIE.